United States Patent
Abe et al.

(10) Patent No.: US 12,520,127 B2
(45) Date of Patent: Jan. 6, 2026

(54) USER EQUIPMENT, NETWORK DEVICE, AND RADIO COMMUNICATION METHOD

(71) Applicant: NTT DOCOMO, INC., Tokyo (JP)

(72) Inventors: Motohiro Abe, Tokyo (JP); Kenichiro Aoyagi, Tokyo (JP); Shinya Takeda, Tokyo (JP); Hiroshi Ishikawa, Tokyo (JP); Kazuto Shimizu, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/045,047

(22) PCT Filed: Feb. 27, 2019

(86) PCT No.: PCT/JP2019/007508
§ 371 (c)(1),
(2) Date: Oct. 2, 2020

(87) PCT Pub. No.: WO2019/193879
PCT Pub. Date: Oct. 10, 2019

(65) Prior Publication Data
US 2021/0168588 A1    Jun. 3, 2021

(30) Foreign Application Priority Data
Apr. 5, 2018   (JP) ................... 2018-072977

(51) Int. Cl.
*H04W 8/22* (2009.01)
*H04W 8/02* (2009.01)

(52) U.S. Cl.
CPC ............... *H04W 8/22* (2013.01); *H04W 8/02* (2013.01)

(58) Field of Classification Search
CPC ......... H04W 8/22; H04W 8/02; H04W 60/00; H04W 8/06; H04W 8/24; H04W 4/24;
(Continued)

(56) References Cited

U.S. PATENT DOCUMENTS

| | | | |
|---|---|---|---|
| 10,405,296 B2* | 9/2019 | Xu | H04W 92/20 |
| 2010/0202458 A1* | 8/2010 | Sato | H04W 28/06 |
| | | | 370/392 |

(Continued)

FOREIGN PATENT DOCUMENTS

| | | | | |
|---|---|---|---|---|
| CA | 3054407 A1 * | 8/2018 | ............ | H04W 76/10 |
| CN | 104683939 A | 6/2015 | | |

(Continued)

OTHER PUBLICATIONS

3GPP TSG SA WG2, Identification of LTE-M (eMTC) traffic [online], 3GPP TSG-SA2 #126 S2-182412 (Year: 2018).*

(Continued)

*Primary Examiner* — Ayaz R Sheikh
*Assistant Examiner* — Louis Samara
(74) *Attorney, Agent, or Firm* — Osha Bergman Watanabe & Burton LLP (57) ABSTRACT

A UE 200 operates as any one of a plurality of categories according to capability. The UE 200 includes: an attach processing unit 220 that performs attaching to a core network; an operation control unit 230 that causes the UE 200 to operate as a restricted category whose capability is restricted as compared to a normal category; and a category notification unit 240 that notifies the core network of a category in which the UE 200 is operating at the time of the attaching or after the attaching.

2 Claims, 5 Drawing Sheets

(58) Field of Classification Search
CPC .... H04W 4/70; H04W 88/02; H04L 12/1407; H04M 15/64; H04M 15/65; H04M 15/66; H04M 15/8228
USPC .......................................................... 370/328
See application file for complete search history.

(56) References Cited

U.S. PATENT DOCUMENTS

| | | | | |
|---|---|---|---|---|
| 2011/0189971 | A1* | 8/2011 | Faccin | H04W 76/10 455/466 |
| 2011/0201343 | A1 | 8/2011 | Pinheiro et al. | |
| 2012/0094629 | A1* | 4/2012 | Liu | H04W 36/06 455/435.1 |
| 2013/0046821 | A1* | 2/2013 | Alanara | H04W 52/0216 709/204 |
| 2013/0203455 | A1 | 8/2013 | Takano | |
| 2013/0303166 | A1 | 11/2013 | Jain et al. | |
| 2014/0094139 | A1* | 4/2014 | Xu | H04W 4/70 455/406 |
| 2014/0162671 | A1* | 6/2014 | Kim | H04W 4/70 455/452.1 |
| 2014/0215072 | A1 | 7/2014 | Li | |
| 2014/0370922 | A1* | 12/2014 | Richards | H04W 68/02 455/458 |
| 2015/0092590 | A1* | 4/2015 | Zhu | A61M 11/001 370/329 |
| 2015/0289115 | A1* | 10/2015 | Abplanalp | H04M 3/42348 455/519 |
| 2015/0312787 | A1* | 10/2015 | Das | H04W 36/0033 370/329 |
| 2016/0029275 | A1* | 1/2016 | Guo | H04W 36/0064 455/436 |
| 2016/0057730 | A1* | 2/2016 | Truelove | H04W 68/04 455/434 |
| 2016/0192263 | A1 | 6/2016 | Zembutsu et al. | |
| 2017/0127263 | A1* | 5/2017 | Chen | H04W 24/08 |
| 2017/0142204 | A1* | 5/2017 | Kodaypak | H04W 4/50 |
| 2017/0245316 | A1* | 8/2017 | Salkintzis | H04W 48/16 |
| 2017/0339681 | A1* | 11/2017 | Hussain | H04L 1/0045 |
| 2017/0367047 | A1 | 12/2017 | Fujishiro et al. | |
| 2018/0084525 | A1* | 3/2018 | Tamura | H04W 68/00 |
| 2018/0234858 | A1* | 8/2018 | Futaki | H04W 68/005 |
| 2019/0141777 | A1* | 5/2019 | Kim | H04W 76/19 |
| 2019/0174392 | A1* | 6/2019 | Chun | H04W 48/02 |
| 2022/0116867 | A1* | 4/2022 | Song | H04W 76/20 |

FOREIGN PATENT DOCUMENTS

| | | | | |
|---|---|---|---|---|
| EP | 2536219 | A1 | 12/2012 | |
| JP | 2012-124603 | A | 6/2012 | |
| JP | 2014529963 | A | 11/2014 | |
| JP | 2016-012875 | A | 1/2016 | |
| JP | 2016524420 | A * | 8/2016 | ............ H04W 76/19 |
| JP | 2017-22760 | A * | 1/2017 | ............ H04W 92/12 |
| JP | 2017022760 | A * | 1/2017 | ............... H04B 1/56 |
| JP | 2017225156 | A * | 12/2017 | ............. H04W 4/70 |
| JP | 2018-26738 | A | 2/2018 | |
| WO | WO-2013023191 | A1 * | 2/2013 | ............ H04W 40/02 |
| WO | WO-2013141591 | A1 * | 9/2013 | .......... H04W 36/144 |
| WO | 2013169822 | A1 | 11/2013 | |
| WO | 2016140069 | A1 | 9/2016 | |

OTHER PUBLICATIONS

3GPP TSG-SA2 #126 S2-182412, Mar. 2, 2018 (Year: 2018).*
International Search Report for corresponding International Application No. PCT/JP2019/007508, mailed Apr. 23, 2019 (5 pages).
Written Opinion for corresponding International Application No. PCT/JP2019/007508, mailed Apr. 23, 2019 (4 pages).
Qualcomm Incorporated et al; "Identification of LTE-M (eMTC) traffic"; 3GPP TSG-SA2 Meeting #126, S2-182412; Montreal, Canada; Feb. 26-Mar. 2, 2018 (72 pages).
3GPP TSG SA WG2 Meeting #79; TD S2-102273 "MTC Subscription" Huawei; Kyoto, Japan; May 10-14, 2010 (4 pages).
3GPP TS 23.401 V15.3.0 "3rd Generation Partnership Project; Technical Specification Group Services and System Aspects; General Packet Radio Service (GPRS) enhancements for Evolved Universal Terrestrial Radio Access Network (E-UTRAN) access (Release 15)" Mar. 2018 (405 pages).
Extended European Search Report issued in European Application No. 19782058.2, dated Nov. 23, 2021 (9 pages).
Office Action issued in Russian Application No. 2020134746/07; Dated Jun. 15, 2022 (13 pages).
Office Action issued in Indian Application No. 202037045755; Dated Jul. 13, 2022 (7 pages).
Office Action issued in Japanese Application No. 2020-511646 dated Feb. 28, 2023 (10 pages).
Nokia et al.; "Introduction ot LTE-M RAT-type and Identification of LTE-M UE and traffic in the EPC"; 3GPP TSG-SA2 Meeting #126, S2-181858; Montreal, Canada; Feb. 26-Mar. 2, 2018 (81 pages).
Office Action issued in Chinese Application No. 201980024176.1 dated Jun. 13, 2023 (23 pages).
Office Action issued in Korean Application No. 10-2020-7029995, dated May 22, 2023 (8 pages).
Office Action issued in counterpart Chinese Application No. 201980024176.1, mailed Mar. 29, 2024 (11 pages).
Office Action issued in counterpart Korean Application No. 10-2020-7029995, mailed Feb. 26, 2024 (8 pages).
Office Action issued in counterpart Chinese Patent Application No. 201980024176.1 mailed on Nov. 21, 2023 (16 pages).
Office Action issued in corresponding European Application No. 19782058.2, mailed Apr. 16, 2024 (4 pages).
Office Action issued in counterpart Chinese Application No. 201980024176.1, Mailed Jul. 29, 2024 (13 pages).
3GPP TSG-SA2 Meeting #126; S2-181858 "Introduction of LTE-M RAT-type and Identification of LTE-M UE and traffic in the EPC" Nokia, Nokia Shanghai Bell; Montreal, Canada, Feb. 26-Mar. 2, 2018 (81 pages).
Office Action issued in Japanese Application No. 2023-144620; Dated Nov. 12, 2024 (9 pages).
Office Action issued in Korean Application No. 10-2020-7029995; Dated Nov. 28, 2024 (9 pages).
Office Action issued in Indian Application No. 202037045755; Dated Jan. 13, 2025 (2 pages).
Office Action issued in Japanese Patent Application No. 2023-144620, issued Apr. 15, 2025 (6 pages).
3GPP TR 21.914 V0.5.0; "3rd Generation Partnership Project; Technical Specification Group Services and System Aspects; Release 14 Description; Summary of Rel-14 Work Items (Release 14)"; (106 pages).
3GPP TSG-SA2 Meeting #126; S2-182412 "Identification of LTE-M (eMTC) traffic" Qualcomm Incorporated, Nokia, Nokia Shanghai Bell, Orange; Montreal, Canada; Feb. 26-Mar. 2, 2018 (72 pages).
Office Action issued in New Zealand Patent Application No. 769297; Dated Jul. 9, 2025 (13 pages).
Office Action issued in Korean Patent Application No. 10-2020-7029995; Dated Jul. 27, 2025 (8 pages).
Office Action issued in Japanese Patent Application No. 2023-144620; Dated Aug. 20, 2025 (3 pages).

* cited by examiner

USER EQUIPMENT, NETWORK DEVICE, AND RADIO COMMUNICATION METHOD

TECHNICAL FIELD

The present invention relates to a user equipment that operates as any one of a plurality of categories according to capability, a network device, and a radio communication method.

BACKGROUND ART

The 3rd Generation Partnership Project (3GPP) specifies Long Term Evolution (LTE) and specifies LTE-Advanced (hereinafter referred to as LTE including LTE-Advanced) for the purpose of speeding up LTE. In addition, in the 3GPP, specifications for a successor system of LTE, called 5G New Radio (NR), are also being studied.

In LTE Release-13 or later, categories (UE categories) for inexpensive terminals (user equipments) such as Internet of Things (IoT) modules are defined. Specifically, the categories M1 and M2 (hereinafter referred to as Cat.M) are specified. These categories are also referred to as LTE-M or enhanced Machine Type Communication (eMTC).

Since a user equipment that operates as Cat.M has restricted capability (communication speed, etc.) as compared to a user equipment (smartphone, etc.) that operates as a normal category (Cat. 4-6, etc.), there is a need to differentiate in terms of price. However, in a conventional LTE Release (Release-14) specification, a core network cannot determine whether a user equipment is operating as Cat.M (restricted category).

Thus, it has been proposed that a radio base station (eNB) determines a category of a user equipment based on a cell type in which the user equipment resides when attaching to a core network (see Non Patent Document 1). The eNB notifies the core network (specifically, Mobility Management Entity (MME)) that the user equipment is operating as Cat.M.

CITATION LIST

Non Patent Literature

Non Patent Literature 1: "Identification of LTE-M (eMTC) traffic", S2-182412, 3GPP TSG-SA2 Meeting #126, 3GPP, February 2018

SUMMARY OF INVENTION

However, the above-described method of notifying the category (Cat.M) to the core network by the eNB has the following problems. Specifically, if the user equipment has capabilities of both Cat.M and the normal category, the user equipment can switch the categories after attaching to the core network.

Therefore, if such category switching occurs, there is a problem that the above-described notification method cannot cope with.

Therefore, the present invention has been made in view of such a circumstance, and an object of the present invention is to provide: a user equipment that can reliably notify a category of an operating UE to a core network or the like even if having capability of a plurality of UE categories including Cat.M; a network device; and a radio communication method.

According to one aspect of the present invention, a user equipment (UE 200) operating as any one of a plurality of categories according to capability includes: an attach processing unit (attach processing unit 220) that performs attaching to a core network; an operation control unit (operation control unit 230) that causes the user equipment to operate as a restricted category (Cat.M, LTE-M, or eMTC) whose capability is restricted as compared to a normal category; and a category notification unit (category notification unit 240) that notifies the core network of a category in which the user equipment is operating at the time of the attaching or after the attaching.

According to one aspect of the present invention, a network device (for example, MME 300) constituting a core network includes: a category reception unit (category reception unit 301) that receives, from a user equipment (UE 200) operating as any one of a plurality of categories according to capability, a category in which the user equipment is operating; and a category transfer unit (category transfer unit 305) that transfers the category received by the category reception unit to another network device (S-GW 310) or a charging system.

According to one aspect of the present invention, a radio communication method, which is performed by a user equipment operating as any one of a plurality of categories according to capability, includes: a step of causing the user equipment to operate as a restricted category whose capability is restricted as compared to a normal category; and a step of causing the user equipment to notify a core network of a category in which the user equipment is operating at the time of attaching to the core network or after the attaching.

DESCRIPTION OF EMBODIMENTS

Hereinafter, embodiments will be described with reference to the drawings. It should be noted that the same functions or configurations are denoted by the same or similar reference numerals, and a description thereof will be omitted as appropriate.

(1) Overall Schematic Configuration of Radio Communication System

Figure 1:
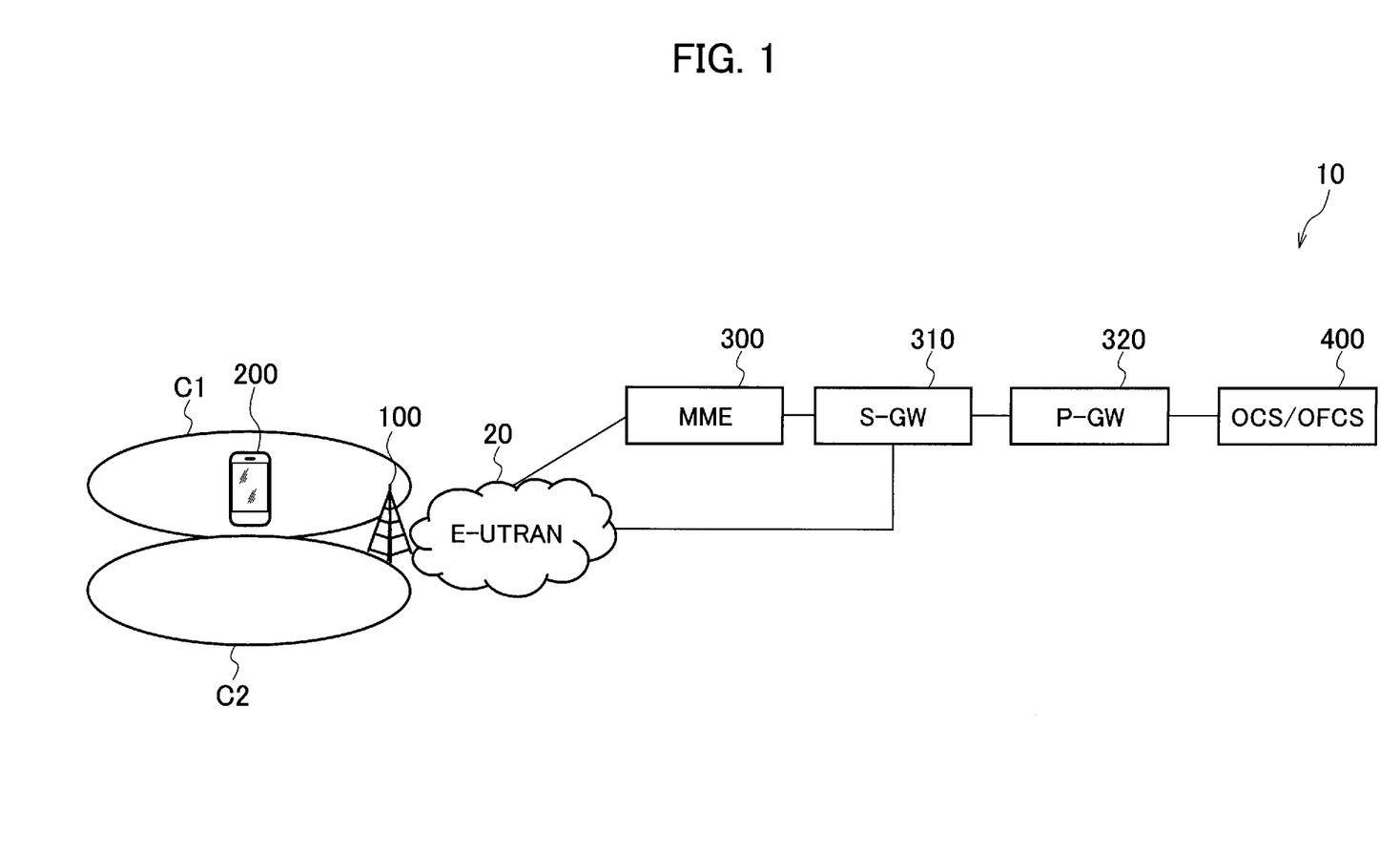
FIG. 1 is an overall schematic configuration diagram of a radio communication system 10.

FIG. 1 is an overall schematic configuration diagram of a radio communication system 10 according to the present embodiment. The radio communication system 10 is a radio communication system in accordance with Long Term Evolution (LTE) and includes a radio access network 20 and a user equipment 200 (hereinafter, UE 200).

The radio access network 20 is an Evolved Universal Terrestrial Radio Access Network (E-UTRAN) defined in the 3GPP and includes a radio base station 100 (hereinafter, eNB 100).

It should be noted that the radio communication system 10 is not necessarily limited to LTE (E-UTRAN). For example, the radio access network 20 may be a radio access network including a radio base station that performs radio communication with the UE 200 (user equipment) defined as 5G.

The eNB 100 and the UE 200 perform radio communication in accordance with the specification of LTE. In particular, in the present embodiment, the UE 200 operates as a category (UE category) for an inexpensive terminal (user equipment) such as an Internet of Things (IoT) module.

Specifically, the UE 200 can operate as categories M1 and M2 (hereinafter, Cat.M). It should be noted that Cat.M is also referred to as LTE-M or eMTC (hereinafter, LTE-M or eMTC is also used as appropriate).

In addition, in the present embodiment, the UE 200 can also operate as a normal UE category (normal category), and specifically, Cat. 4-6 or the like. That is, the UE 200 can operate as any one of a plurality of categories according to the capability of the user equipment including radio capability (communication speed, etc.).

The eNB 100 can form a plurality of cells according to the UE category. In the present embodiment, the eNB 100 forms a cell C1 for the normal category (Cat. 4-6, etc.) and a cell C2 for Cat.M1.

A Mobility Management Entity 300 (hereinafter, MME 300) is connected to the radio access network 20. The MME 300 accommodates the eNB 100 and provides mobility control of the UE 200 and the like.

The Serving Gateway 310 (hereinafter, S-GW 310) is connected to the MME 300. In addition, a Packet Data Network Gateway 320 (hereinafter, P-GW 320) is connected to the S-GW 310. The MME 300, the S-GW 310, and the P-GW 320 constitute the core network.

The S-GW 310 performs transfer of a user data packet to the UE 200 and the like. The P-GW 320 is provided at a point of connection with a Packet Data Network (PDN) that is an external network, and performs assignment of an IP address for the UE 200, transfer of a packet to the S-GW 310, and the like.

An Online Charging System/Offline Charging System 400 (hereinafter, OCS/OFCS 400) perform charging processing associated with provision of communication services for the UE 200. The OCS/OFCS 400 acquires a communication state of the UE 200 and performs charging processing according to service contents. In the present embodiment, the OCS/OFCS 400 constitutes a charging system.

(2) Functional Block Configuration of Radio Communication System

Next, the functional block configuration of the radio communication system 10 will be described. Specifically, the functional block configurations of the UE 200, the MME 300, the S-GW 310, and the P-GW 320 will be described. Hereinafter, only portions related to the features of the present embodiment will be described. Therefore, it is obvious that the device includes other functional blocks that are not directly related to the features of the present embodiment.

(2.1) UE 200

Figure 2:
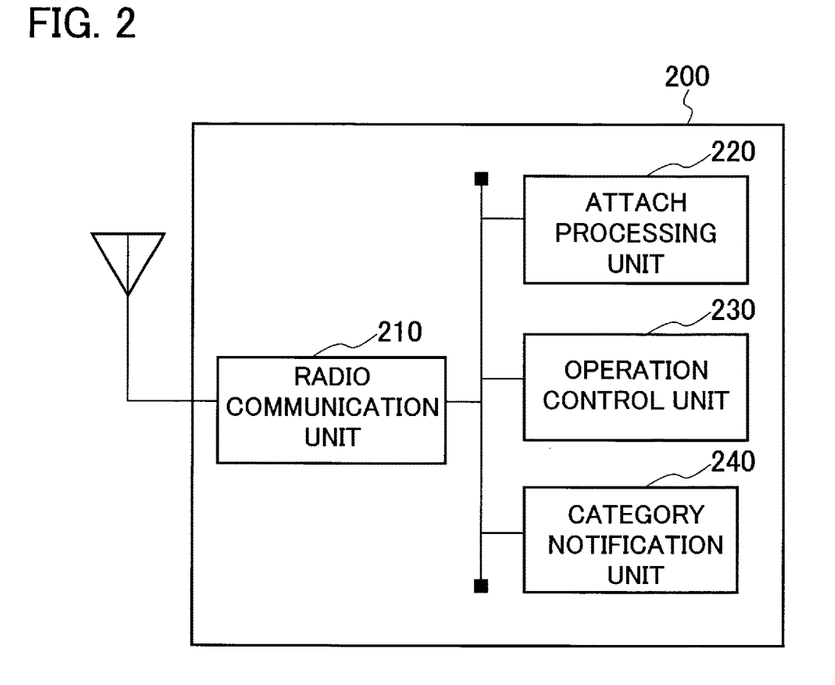
FIG. 2 is a functional block configuration diagram of a UE 200.

FIG. 2 is a functional block configuration diagram of the UE 200. As illustrated in FIG. 2, the UE 200 includes a radio communication unit 210, an attach processing unit 220, an operation control unit 230, and a category notification unit 240.

The radio communication unit 210 performs radio communication in accordance with an LTE scheme. Specifically, the radio communication unit 210 transmits and receives radio signals with the eNB 100 in accordance with the LTE scheme.

The attach processing unit 220 performs attaching to the core network. Specifically, the attach processing unit 220 performs attach processing to the core network by transmitting an attach request to the MME 300. In addition, the attach processing unit 220 receives, from the core network, an attach accept indicating that the attach request has been accepted.

The attach request and the attach accept are a type of a Non-Access Stratum (NAS) message and are defined in 3GPP TS24.301.

The operation control unit 230 controls the operation of the UE 200. In particular, in the present embodiment, the operation control unit 230 controls which UE category the UE 200 operates as.

Specifically, the operation control unit 230 can cause the UE 200 to operate as Cat.M1 (restricted category) whose capability is restricted as compared to the normal category (Cat. 4-6, etc.). It is obvious that the operation control unit 230 can also cause the UE 200 to operate in any UE category of Cat. 4-6.

The operation control unit 230 can switch the category of the UE 200 between the normal category and the restricted category. However, the UE 200 may be a user equipment dedicated to Cat.M, without corresponding to the normal category.

The category notification unit 240 notifies the core network of the category of the UE 200. Specifically, the category notification unit 240 notifies the core network of the category in which the UE 200 is operating.

As described above, the UE 200 can operate as any one of a plurality of categories (normal category or restricted category). The category notification unit 240 notifies the core network of the UE category in which the UE 200 is currently operating, based on the control result obtained by the operation control unit 230.

When attaching to the core network by the attach processing unit 220, the category notification unit 240 can notify the core network of the category in which the UE 200 is operating. In addition, after attaching, the category notification unit 240 can also notify the core network of the category in which the UE 200 is operating.

Specifically, when the category of the UE 200 is switched by the operation control unit 230, the category notification unit 240 can notify the core network of the category in which the UE 200 is operating.

Alternatively, when the UE 200 resides in a cell for Cat.M1 (cell C2), the category notification unit 240 may notify the core network of the category in which the UE 200 is operating, that is, Cat.M1.

The category notification unit 240 uses the NAS message to notify the MME 300 of the UE category in which the UE 200 is operating. The attach request can be used when attaching to the core network. After attaching, service request (see chapter 8.2.25 of TS24.301), tracking area update complete (see chapter 8.2.27 of TS 24.301), and the like can be used according to a category switching timing of the UE 200 by the operation control unit 230. Alternatively, a new NAS message that notifies the UE category in which the UE 200 is operating may be used.

Figure 6:
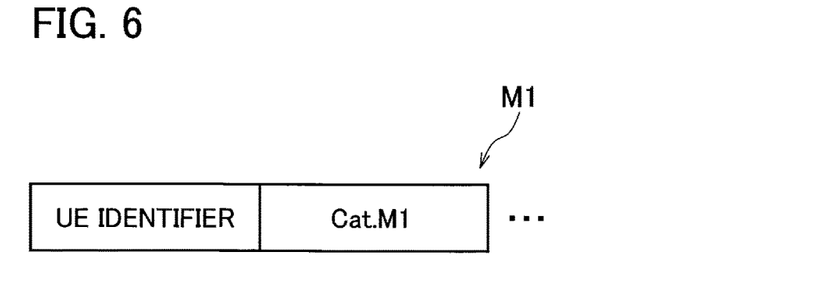
FIG. 6 is a diagram illustrating a schematic configuration example of a Non-Access Stratum (NAS) message that the UE 200 transmits toward the core network.

FIG. 6 illustrates a schematic configuration example of a NAS message that the UE 200 transmits toward the core network.

As illustrated in FIG. 6, a message M1, which is a NAS message, includes a UE identifier (for example, EPS mobile identity) that can uniquely identify the UE 200, and information (Cat.M1) about the category in which the UE 200 is operating. It is obvious that, in practice, the message M1 includes much more elements (see, for example, chapter 8.2.4 of 3GPP TS24.301 in the case of attach request).

(2.2) MME 300 and S-GW 310

Figure 3:
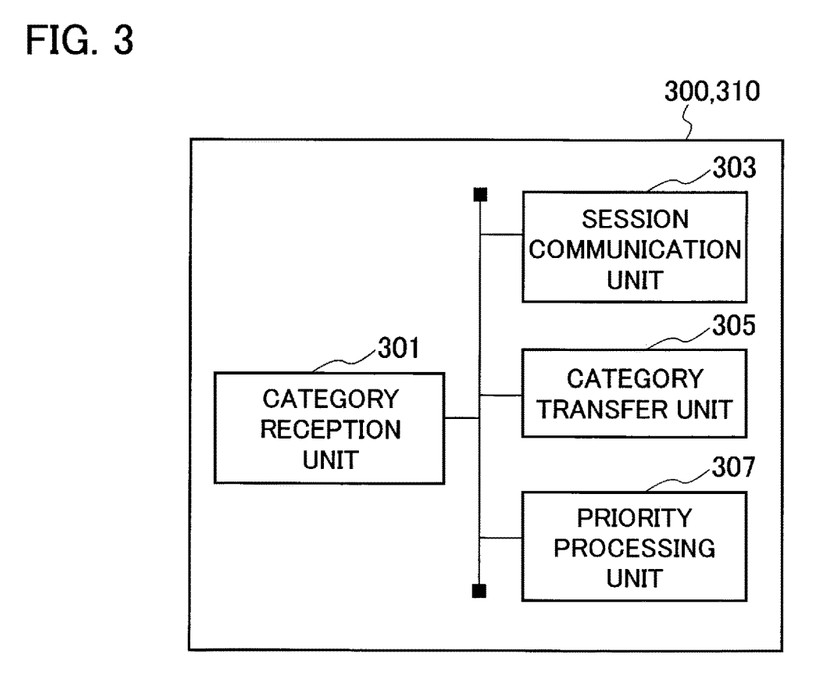
FIG. 3 is a functional block configuration diagram of an MME 300 and an S-GW 310.

FIG. 3 is a functional block configuration diagram of the MME 300 and the S-GW 310. That is, the MME 300 and the S-GW 310 have the same functional block configuration with respect to the characteristic parts in the present embodiment. Hereinafter, the MME 300 will be described as an example.

As illustrated in FIG. 3, the MME 300 includes a category reception unit 301, a session communication unit 303, a category transfer unit 305, and a priority processing unit 307.

The category reception unit 301 receives, from the UE 200, a category in which the UE 200 is operating. Specifically, the category reception unit 301 acquires category information (see FIG. 6) included in the NAS message transmitted from the UE 200.

The session communication unit 303 establishes a Non-Access Stratum (NAS) session necessary for communication with the UE 200, and performs communication via the corresponding session. In addition, the session communication unit 303 establishes a GPRS Tunneling Protocol (GTP) session necessary for communication with the S-GW 310, and performs communication via the corresponding session.

The category transfer unit 305 transfers the category of the UE 200 received by the category reception unit 301 to the S-GW 310 (another network device). Specifically, the category transfer unit 305 transfers the category of the UE 200 to the S-GW 310 via the GTP session established by the session communication unit 303.

The configuration of the message transferred to the S-GW 310 by the category transfer unit 305 is substantially the same as the NAS message (message M1) illustrated in FIG. 6.

The priority processing unit 307 performs priority processing for the UE 200. For example, if the category in which the UE 200 is operating is Cat.M1, the priority processing unit 307 can perform packet transfer for the UE 200 with higher priority than the user equipment of the normal category.

Alternatively, if the category in which the UE 200 is operating is Cat.M1, the priority processing unit 307 can perform packet transfer for the UE 200 with lower priority than the user equipment of the normal category.

It should be noted that, in the case of the S-GW 310, the session communication unit 303 establishes a GTP session with the MME 300 and the P-GW 320, and the category transfer unit 305 transfers the category of the UE 200 to the P-GW 320.

(2.3) P-GW 320

Figure 4:
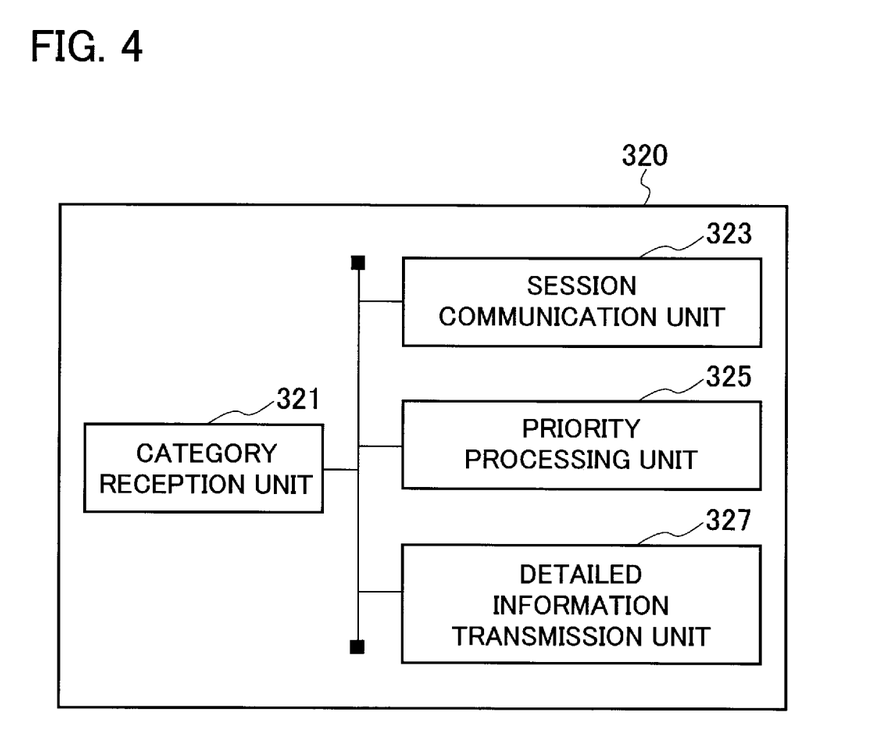
FIG. 4 is a functional block configuration diagram of a P-GW 320.

FIG. 4 is a functional block configuration diagram of the P-GW 320. As illustrated in FIG. 4, the P-GW 320 includes a category reception unit 321, a session communication unit 323, a priority processing unit 325, and a detailed information transmission unit 327.

The category reception unit 321 receives, from the S-GW 310, the category in which the UE 200 is operating. Specifically, the category reception unit 321 acquires category information included in a message via the GTP session transmitted from the S-GW 310.

The session communication unit 323 establishes a GTP session with the S-GW 310. In addition, the session communication unit 323 establishes a GTP session necessary for communication with the OCS/OFCS 400. It should be noted that the session communication unit 323 may establish a File Transfer Protocol (FTP) session with the OCS/OFCS 400.

The priority processing unit 325 performs priority processing for the UE 200. The priority processing unit 325 provides the same function as the priority processing unit 307 of the MME 300 (S-GW 310).

The detailed information transmission unit 327 transmits detailed information to the OCS/OFCS 400. The detailed information indicates usage details of communication service by the UE 200 (communication service type (including a type of Cat.M or the normal category), communication time, packet amount, etc.).

Figure 7:
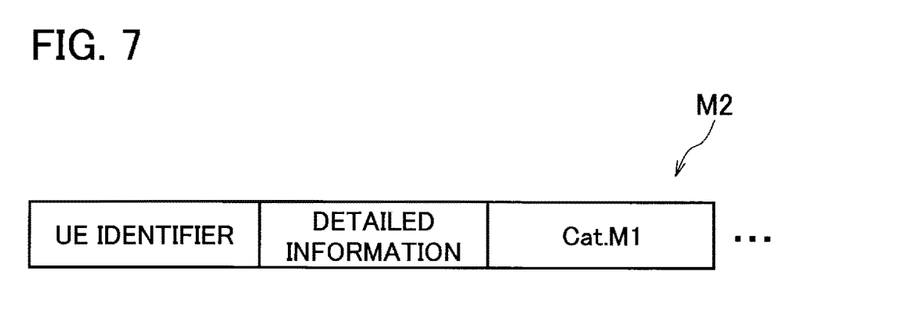
FIG. 7 is a diagram illustrating a schematic configuration example of a message that the P-GW 320 transmits toward an Online Charging System/Offline Charging System (OCS/OFCS) 400.

FIG. 7 illustrates a schematic configuration example of a message that the P-GW 320 transmits toward the OCS/OFCS 400.

As illustrated in FIG. 7, a message M2, which is transmitted via the GTP session (or the FTP session), includes a UE identifier (for example, EPS mobile identity) that can uniquely identify the UE 200, detailed information, and information (Cat.M1) about the category in which the UE 200 is operating.

The OCS/OFCS 400 that receives the message M2 uses information about the category to perform charging processing according to a usage situation of the communication service by the UE 200.

(3) Operation of Radio Communication System

Next, the operation of the radio communication system 10 will be described. Specifically, the operation of notifying the core network of the category in which UE 200 is operating will be described.

Figure 5:
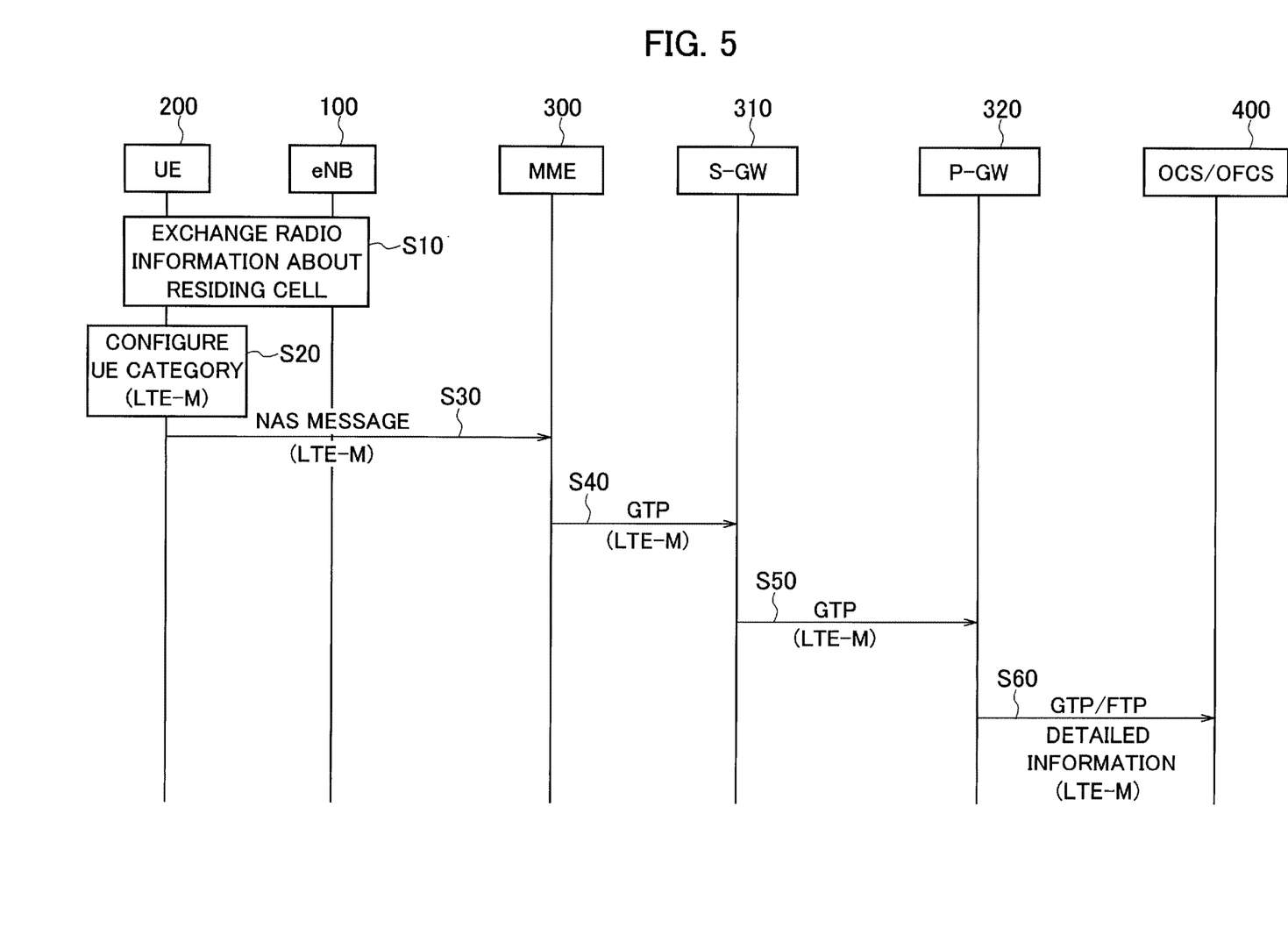
FIG. 5 is a diagram illustrating a sequence of notifying a core network of a category in which the UE 200 is operating.

FIG. 5 illustrates a sequence of notifying the core network of the category in which the UE 200 is operating. As illustrated in FIG. 5, the eNB 100 and the UE 200 exchange radio information about a cell in which the UE 200 resides (S10).

Here, it is assumed that the UE 200 resides in a Cat.M1 cell (cell C2). The eNB 100 and the UE 200 secure a radio resource according to Cat.M1 and perform establishment of a radio bearer between the eNB 100 and the UE 200, and the like. Thereby, radio communication between the eNB 100 and the UE 200 is enabled.

The UE 200 configures the category (UE category) of the UE 200 to Cat.M1 in association with the residence in the Cat.M1 cell (cell C2) (S20). It should be noted that, in FIG. 5, "LTE-M" is used for the purpose of including restricted categories (Cat.M2, etc.) other than Cat.M1.

The UE 200 transmits the NAS message (see FIG. 6) to the MME 300 (S30). As described above, when attaching to the core network, the UE 200 transmits the attach request to the MME 300. The attach request includes information (LTE-M) about the category in which the UE 200 is operating.

In addition, the UE 200 may transmit the NAS message to the MME 300 after attaching to the core network. As described above, examples of the NAS message include service request and tracking area update complete according to the category switching timing of the UE 200.

The MME 300 transfers, to the S-GW 310, the category (LTE-M) included in the NAS message received from the UE 200 (S40). Specifically, the MME 300 transfers the message including the category to the S-GW 310 via the GTP session.

In addition, the MME 300 may perform priority processing with respect to the UE 200 based on the received category. As described above, the priority processing includes increasing or decreasing the priority of the packet transfer for the UE 200.

Similarly, the S-GW 310 transfers, to the P-GW 320, the category (LTE-M) included in the message received from the MME 300 (S50). Specifically, the S-GW 310 transfers the message including the category to the P-GW 320 via the GTP session. In addition, the S-GW 310 may also perform the priority processing with respect to the UE 200 based on the received category.

The P-GW 320 transmits the detailed information about the UE 200 to the OCS/OFCS 400 (S60). Specifically, the P-GW 320 adds, to the detailed information, the category (LTE-M) included in the message transferred from the S-GW 310.

The P-GW 320 transmits a message (see FIG. 7) including the category and the detail information to the OCS/OFCS 400. In addition, the P-GW 320 may also perform the priority processing with respect to the UE 200 based on the received category.

The OCS/OFCS 400 uses information about the category to perform charging processing according to a usage situation of the communication service by the UE 200. That is, since the OCS/OFCS 400 can recognize in which category the UE 200 is operating in substantially real time, a specific charging plan for the category (LTE-M) can be applied.

(4) Operation and Effect

According to the above-described embodiment, the following effects can be obtained. Specifically, the UE 200 notifies the core network of the category (LTE-M) in which the UE 200 is operating. In particular, the UE 200 can notify the core network of the category in which the UE 200 is operating at the time not only even when attaching to the core network but also even after attaching.

Thus, even when the category of the UE 200 is switched after attaching to the core network, the category in which UE 200 is operating after the switching can be reliably notified to the core network.

Such an event may occur when the UE 200 can operate in any one of a plurality of categories, but even in such a case, the UE 200 can reliably notify the core network of the operating category.

In addition, the MME 300, the S-GW 310, and the P-GW 320 constituting the core network can sequentially transfer information indicating the category and notify the OCS/OFCS 400 of the category.

That is, according to the radio communication system 10, even if the UE 200 has capabilities of a plurality of UE categories including Cat.M (LTE-M, eMTC, etc.), the UE 200 can reliably notify the core network of the operating UE category. In addition, the core network can reliably notify the OCS/OFCS 400 of the UE category.

Furthermore, the OCS/OFCS 400 can apply a charging policy or the like according to the category based on the information about the category. Thereby, it is possible to differentiate charging policies for the user equipment operating as the normal category and the user equipment operating as Cat.M (LTE-M, eMTC, etc.).

In the present embodiment, when the category of the UE 200 is switched, the UE 200 can notify the core network of the category in which the UE 200 is operating. Therefore, the core network and the OCS/OFCS 400 can recognize in which category the UE 200 is operating in substantially real time. Thereby, it is possible to differentiate fine services and charging policies based on the category in which the UE 200 is currently operating.

In the present embodiment, when the UE 200 resides in the Cat.M1 cell (cell C2), the category (Cat.M1) in which the previous UE 200 is operating can be notified to the core network. Therefore, when the UE 200 attaches to the core network or even when the category is switched after attaching, the category in which the UE 200 is operating can be detected by a common scheme. Thereby, the implementation of the UE 200 can be simplified.

In the present embodiment, the UE 200 uses the NAS message to notify the core network of the UE category in which the UE 200 is operating. Therefore, while using an existing NAS message, the category in which the UE 200 is operating can be notified to the core network. Thereby, the implementation of the UE 200 can be simplified.

(5) Other Embodiments

Although the contents of the present invention have been described along with the embodiment, the present invention is not limited to these descriptions, and it will be obvious to those skilled in the art that various modifications and improvements can be made thereto.

In the above-described embodiment, the UE 200 transmits, to the MME 300, the NAS message including the category in which the UE 200 is operating, and the MME 300, the S-GW 310, and the P-GW 320 sequentially transfer the category. However, the UE 200 may directly transmit a message including the category to the S-GW 310 or the P-GW 320, instead of the MME 300, according to the type of the message.

In the above-described embodiment, the P-GW 320 establishes the GTP or FTP session with the OCS/OFCS 400, but the session established between the P-GW 320 and the OCS/OFCS 400 is not limited to the GTP or the FTP. That is, sessions other than the GTP or the FTP may be used as long as the message M2 (see FIG. 7) including the UE identifier, the detailed information, and the category information can be transmitted.

In the above-described embodiment, Cat.M (LTE-M, eMTC, etc.) has been described as an example, but if it is a category for IoT that is different from the normal category (Cat. 4-6, etc.), the present invention is not limited to these categories. For example, there may be a category for Narrow Band (NB)-IoT.

Furthermore, the block configuration diagrams used for explaining the above-described embodiment (FIGS. 2 to 4) illustrate the functional blocks. Those functional blocks (structural components) can be realized by a desired combination of hardware and/or software. Means for realizing each functional block is not particularly limited. That is, each functional block may be realized by one device combined physically and/or logically. Alternatively, two or more devices separated physically and/or logically may be directly and/or indirectly connected (for example, wired, or wireless) to each other, and each functional block may be realized by these plural devices.

Figure 8:
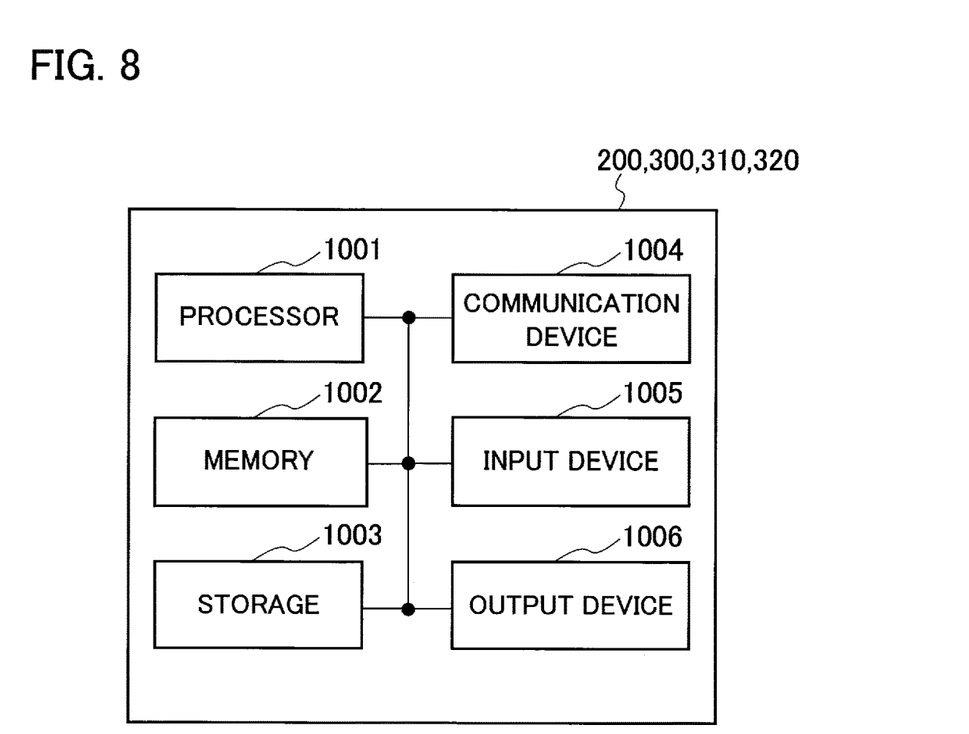
FIG. 8 is a diagram illustrating an example of a hardware configuration of the UE 200, the MME 300, the S-GW 310, and the P-GW 320.

Furthermore, the UE 200, the MME 300, the S-GW 310, and the P-GW 320 (device) described above may function as a computer that performs the processing of the present invention. FIG. 8 is a diagram illustrating an example of a hardware configuration of the device. As illustrated in FIG. 8, the device can be configured as a computer device including a processor 1001, a memory 1002, a storage 1003, a communication device 1004, an input device 1005, an output device 1006, a bus 1007, and the like.

The functional blocks of the device (see FIGS. 2 to 4) can be realized by any of hardware elements of the computer device or a desired combination of the hardware elements.

The processor 1001, for example, operates an operating system to control the entire computer. The processor 1001 can be configured with a central processing unit (CPU) including an interface with a peripheral device, a control device, a computing device, a register, and the like.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 can be called register, cache, main memory (main storage device), and the like. The memory 1002 can store a program (program code), a software module, and the like that can perform the above-described method according to the embodiment.

The storage 1003 is a computer readable recording medium. Examples of the storage 1003 include at least one of an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information thereamong. The bus 1007 can be constituted by a single bus or can be constituted by separate buses between the devices.

In addition, the notification of information is not limited to that explained in the above embodiment, and may be performed by other methods. For example, the notification of information may be performed by physical layer signaling (for example, Downlink Control Information (DCI), Uplink Control Information (UCI), higher layer signaling (for example, RRC signaling, Medium Access Control (MAC) signaling, broadcast information (Master Information Block (MIB), System Information Block (SIB)), other signals, or a combination of these. The RRC signaling may be called RRC message, for example, or can be RRC Connection Setup message, RRC Connection Reconfiguration message, or the like.

The input/output information can be stored in a specific location (for example, a memory) or can be managed in a management table. The information to be input/output can be overwritten, updated, or added. The information can be deleted after outputting. The inputted information can be transmitted to another device.

As long as there is no inconsistency, the order of sequences, flowcharts, and the like of the above-described embodiment may be exchanged.

In the above-described embodiment, specific operations that are performed by the MME 300, the S-GW 310, and the P-GW 320 can be performed by another network nod (device). Furthermore, the function of the MME 300, the S-GW 310, or the P-GW 320 can be provided by a combination of a plurality of other network nodes.

It should be noted that the terms described in the present specification and/or terms necessary for understanding the present specification may be replaced by terms having the same or similar meanings. For example, if there is a corresponding description, a channel and/or a symbol may be a signal. Also, a signal may be a message. In addition, the terms "system" and "network" can be used interchangeably.

Furthermore, the parameter and the like can be represented by an absolute value, can be represented by a relative value from a predetermined value, or can be represented by corresponding other information. For example, the radio resource can be instructed to by an index.

The eNB 100 (base station) can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

Furthermore, the terms "base station", "eNB", "cell", and "sector" can be used interchangeably in the present specification. The base station can also be referred to with the terms such as a fixed station, a NodeB, an eNodeB (eNB), a gNodeB (gNB), an access point, a femtocell, or a small cell.

The UE 200 may be called by those skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

As used in the present specification, the phrase "based on" does not mean "based only on" unless explicitly stated otherwise. In other words, the phrase "based on" means both "based only on" and "based at least on".

In addition, the terms "including", "comprising", and variants thereof are intended to be inclusive in a manner similar to the term "comprising". Furthermore, the term "or" used in the present specification or the claims is intended not to be an exclusive OR.

Any reference to an element using a designation such as "first", "second", and the like used in the present specification generally does not limit the amount or order of those elements. Such designations can be used in the present specification as a convenient way to distinguish between two or more elements. Thus, the reference to the first and second elements does not imply that only two elements can be adopted, or that the first element must precede the second element in some or the other manner.

Throughout the present specification, for example, during translation, if articles such as "a", "an", and "the" in English are added, these articles are intended to include the plural forms as well, unless the context clearly indicates otherwise.

As described above, the embodiments of the present invention have been described, but it should not be understood that the description and drawings constituting a part of this disclosure limit this invention. From this disclosure, various alternative embodiments, examples, and operational technologies will become apparent to those skilled in the art.

REFERENCE SIGNS LIST 10 radio communication system
20 radio access network
100 eNB
200 UE
210 radio communication unit
220 attach processing unit
230 operation control unit
240 category notification unit
300 MME
301 category reception unit
303 session communication unit
305 category transfer unit
307 priority processing unit
310 S-GW
320 P-GW
321 category reception unit
323 session communication unit
325 priority processing unit
327 detailed information transmission unit
400 OCS/OFCS
1001 processor
1002 memory
1003 storage
1004 communication device
1005 input device
1006 output device
1007 bus

The invention claimed is:

1. A network device constituting a core network, the network device comprising:
a category receiver that receives, when a category of a user equipment operating as any one of a plurality of categories according to capability is switched after the user equipment is attached to the core network, the category in which the user equipment is operating after switching; and
a category transferrer that transfers the category received by the category receiver to a serving gateway, which transfers the category received from the category transferrer of the network device to a packet data network gateway,
wherein the network device is a Mobility Management Entity.

2. The network device according to claim 1, wherein the category of the user equipment is one selected from a group comprising a first category and a second category with a restricted capability as compared to the first category.

* * * * *